(12) United States Patent
Creekmore

(10) Patent No.: US 7,093,372 B1
(45) Date of Patent: Aug. 22, 2006

(54) MACHINIST'S ACCURACY TESTING TOOL

(76) Inventor: Michael L. Creekmore, Rt. 1, Box 322, Dardanelle, AR (US) 72834

( * ) Notice: Subject to any disclaimer, the term of this patent is extended or adjusted under 35 U.S.C. 154(b) by 0 days.

(21) Appl. No.: 10/805,772

(22) Filed: Mar. 22, 2004

Related U.S. Application Data

(63) Continuation of application No. 10/355,369, filed on Jan. 31, 2003, now abandoned, and a continuation of application No. 09/906,339, filed on Jul. 16, 2001, now Pat. No. 6,513,255.

(51) Int. Cl.
*G01B 5/25* (2006.01)

(52) U.S. Cl. ..................................................... 33/533

(58) Field of Classification Search ............. 33/533, 33/403, 348, 348.2, 418, 427, 429, 430, 451, 33/452, 474, 476, 479, 482, 483, 492, 494, 33/535; 362/119, 120, 109, 551, 577, 578, 362/556
See application file for complete search history.

(56) References Cited

U.S. PATENT DOCUMENTS

| | | | |
|---|---|---|---|
| 2,745,183 A | 5/1956 | Queen | |
| 3,897,637 A | 8/1975 | Genho | |
| 4,075,467 A | 2/1978 | Peterson | |
| 4,162,578 A | 7/1979 | Astarita | |
| 4,413,417 A | 11/1983 | Esposito | |
| 4,665,623 A | 5/1987 | Wright | |
| 4,729,079 A | 3/1988 | Maylotte | |
| 5,313,713 A | 5/1994 | Heger et al. | |
| 5,864,956 A | 2/1999 | Dong | |
| 6,203,168 B1 | 3/2001 | Bahar et al. | |
| 6,513,255 B1 | 2/2003 | Creekmore | |
| 2004/0130908 A1* | 7/2004 | McClurg et al. | ............ 362/555 |

* cited by examiner

*Primary Examiner*—Christopher W. Fulton
(74) *Attorney, Agent, or Firm*—Frank J. Catalano

(57) ABSTRACT

A tool for use by a machinist in testing the accuracy of a workpiece has an edge to be abutted against the workpiece to be tested and an encased light source connected by a plurality of passages extending within the member to conduct light emitted from the source to an array of apertures spaced at intervals in a bevel of the edge. The array of apertures directs the light at the workpiece on one side of the edge so that defects in accuracy are illuminated to the machinist viewing the workpiece from the other side of the edge. Preferably, a plurality of fiber optic cords extend in the passages from the light source to the apertures.

3 Claims, 6 Drawing Sheets

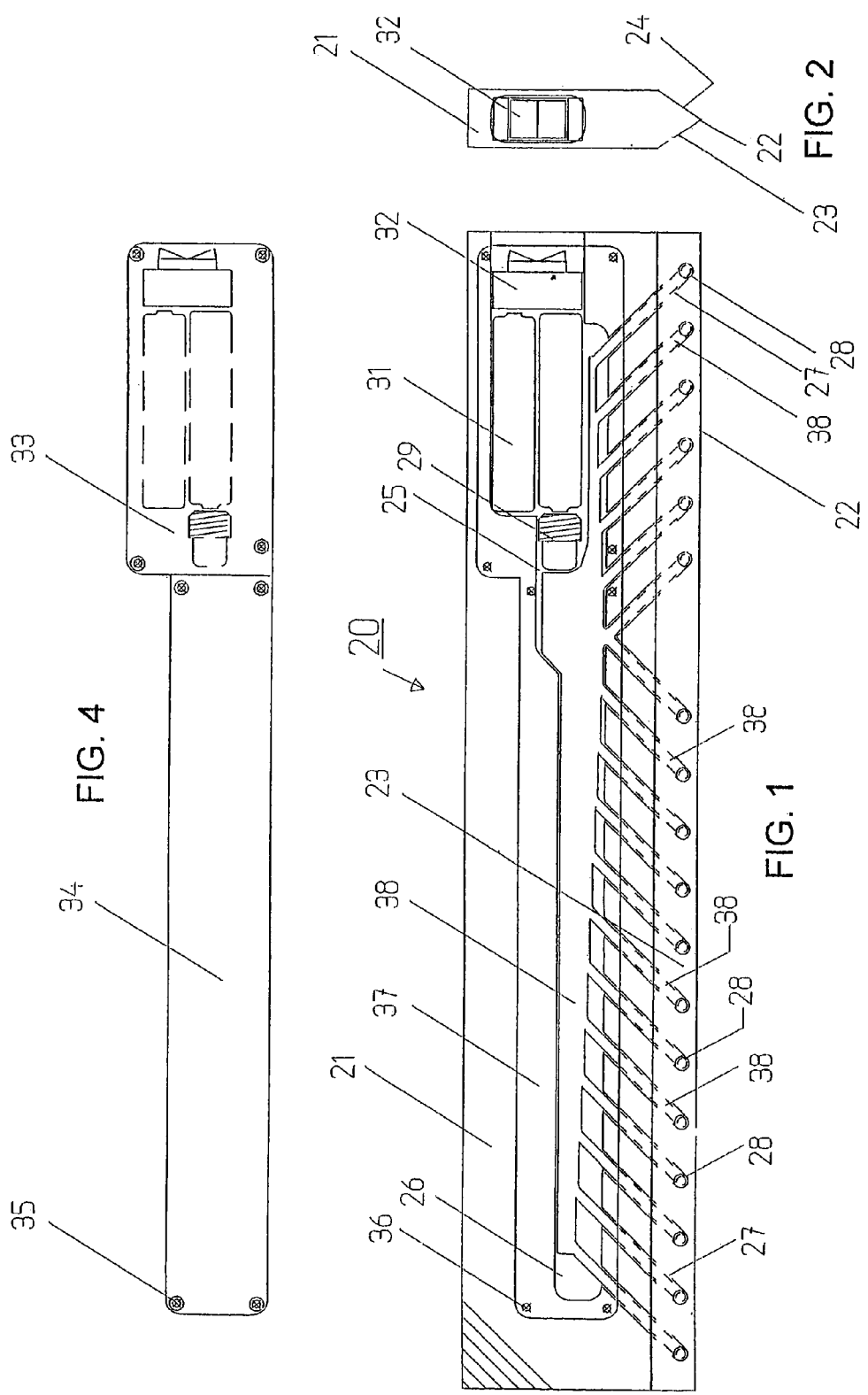

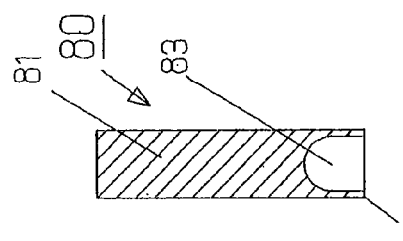
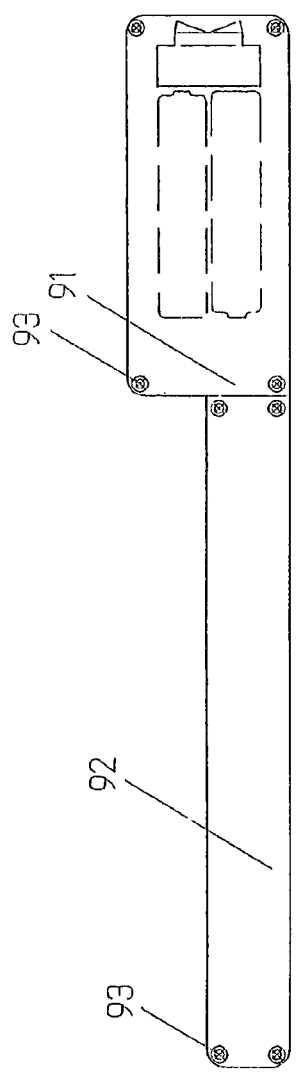
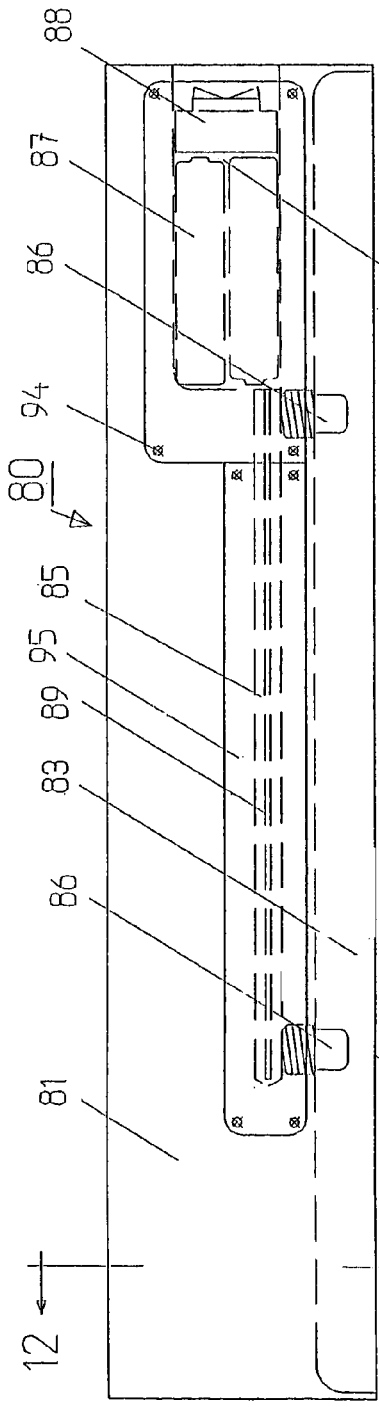
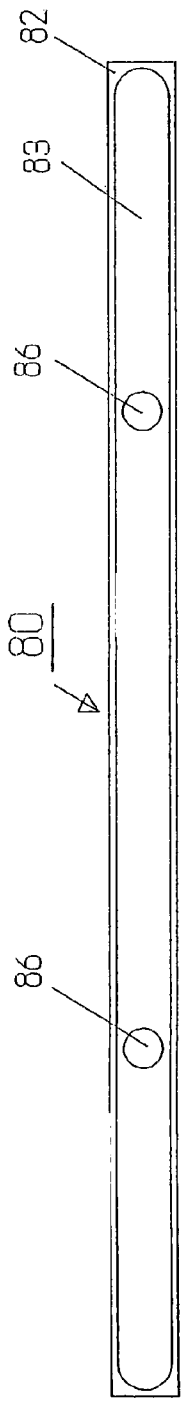
FIG. 12
FIG. 14
FIG. 11
FIG. 13

MACHINIST'S ACCURACY TESTING TOOL

This application is a continuation of application Ser. No. 10/355,369, filed Jan. 31, 2003 now abandoned and a continuation of application Ser. No. 09/906,339 filed Jul. 16, 2001 (U.S. Pat. No. 6,513,255) "Machinist's Accuracy Testing Tool."

BACKGROUND OF THE INVENTION

This invention relates generally to machinist's tools and more particularly concerns tools for checking the accuracy of machining on a workpiece.

The known method for testing the accuracy of a machined workpiece is to hold a flat surface test tool against the piece to be tested with one hand. A light source is then held on one side of the tool with the other hand and the machinist observes from the other side of the tool whether light appears between the tool and the workpiece. This approach is not very efficient for many reasons.

First of all, without even considering the test procedure itself, it is necessary to have both the tool and the light source close at hand. In reality, they are never where you expect them to be when you need them. They are used for other reasons and not returned to the test area or at least not to the place the machinist would look for them. Some machinists keep a light source with them, but pockets and belts can become quickly cluttered and cumbersome.

Secondly, the light sources themselves are not very efficient. They are, typically, point sources such as a flashlight or the like. A proper test should desirably indicate not only the existence of a flaw on the workpiece surface but the location and severity of the flaw as well. Point sources do not disperse light evenly across the surface to be tested. Therefore, they may not always provide accurate information about the flaw.

Finally, the use of an independent light source with the test tool is at best inefficient and cumbersome and, in some applications, nearly if not entirely impossible. The machinist must deal with at least three objects, the workpiece, the test tool and the light source, with only two hands. The machinist's eyes must be on one side of the test tool while one hand holds the tool and the other hand holds and properly directs the light source on the opposite side of the tool. This frequently must be accomplished in situations of limited access so that hand positions are dictated or even prohibited by the workpiece. Often, other objects such as surface plates must be simultaneously manipulated.

It is, therefore, an object of this invention to provide a machinist's accuracy testing tool which has a light source built into the tool. Another object of this invention is to provide a machinist's accuracy testing tool which disperses light from multiple points along the surface of the workpiece. A further object of this invention is to provide a machinist's accuracy testing tool which directs the light from a light source to the appropriate workpiece surface. Yet another object of this invention is to provide a machinist's accuracy testing tool which eliminates the need for holding a light source. It is also an object of this invention to provide a machinist's accuracy testing tool which makes testing more easy, efficient and accurate. Still another object of this invention is to provide a machinist's accuracy testing tool which enables testing to be performed in areas of limited space which might otherwise render testing impossible.

SUMMARY OF THE INVENTION

In accordance with the invention, a tool for use by a machinist in testing the accuracy of a workpiece is provided. An elongated member has an edge to be abutted against the workpiece to be tested. An encased light source is connected by a plurality of passages extending within the member to the edge. The passages conduct light emitted from the source to an array of apertures spaced at intervals in a bevel of the edge. The array of apertures directs the light at the workpiece on one side of the edge so that defects in accuracy are illuminated to the machinist viewing the workpiece from the other side of the edge. Preferably, the member has a chamber in which the light source is encapsulated. In a specially preferred embodiment, a plurality of fiber optic cords extend in the passages from the light source to the apertures. The tool may be a machinist's straight edge, a machinist's square or the like.

For some tools, and especially for squares, it may be desirable to illuminate more than one edge of the tool, such as the inside and outside edges of the square. For such tools, the elongated member has lengthwise opposite first and second edges for abutment with the workpiece to be tested and first and second pluralities of passages extending from the light source to first and second bevels of the first and second edges, respectively. Light is conducted to first and second arrays of apertures spaced at intervals in the first and second bevels, respectively. The first and second arrays of apertures direct the light at the workpiece on one side of their respective edge so that defects in accuracy are illuminated to a machinist viewing the workpiece from the other side of their respective edge. Preferably, the bevels of the first and second edges are on opposite faces of the member so that, for example, a square can be applied at either its outside or inside edges and still be viewed from the same side of the workpiece.

In an alternate embodiment, the edge of the tool may have a cavity extending along its length with an array of apertures spaced along and opening into the cavity. Thus the same edge can be viewed from either side or even both sides simultaneously.

BRIEF DESCRIPTION OF THE DRAWINGS

Other objects and advantages of the invention will become apparent upon reading the following detailed description and upon reference to the drawings in which:

FIG. 1 is a front elevation view of a preferred embodiment of a machinist's straight edge with cover plates removed;

FIG. 2 is an elevation view of one end of the straight edge of FIG. 1;

FIG. 4 is a front elevation view of the cover plates for the straight edge of FIG. 1;

FIG. 11 is a front elevation view of another embodiment of a machinist's straight edge;

FIG. 12 is a cross-sectional view taken along the line 12—12 of FIG. 11;

FIG. 13 is a bottom plan view of the straight edge of FIG. 11; and

FIG. 14 is a front elevation view of the cover plates for the straight edge of FIG. 11.

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION

Figure 3:
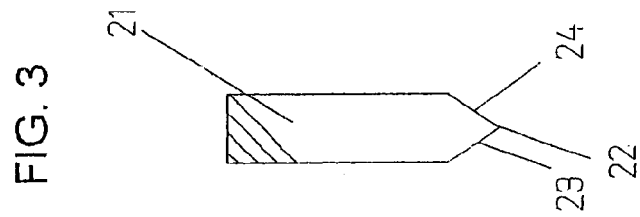
FIG. 3 is an elevation view of the other end of the straight edge of FIG. 1.
Figure 5:
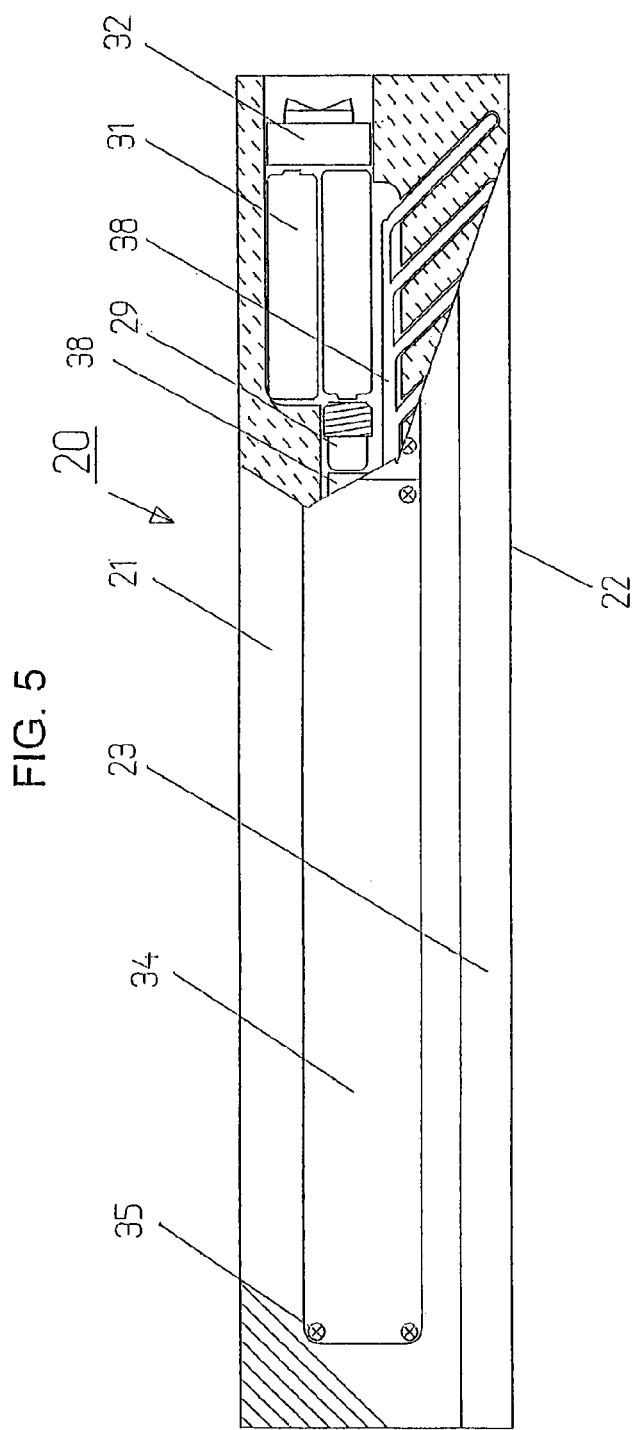
FIG. 5 is a front elevation view with parts broken away of the straight edge of FIG. 1 with the cover plates of FIG. 4.
Figure 7:
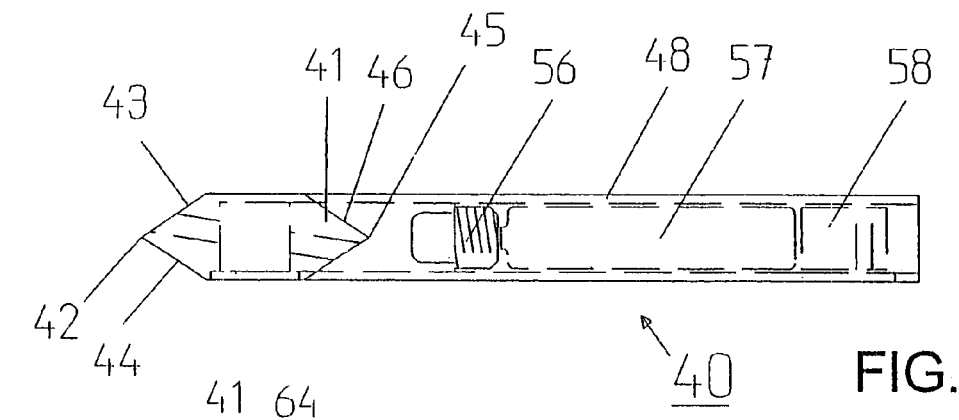
FIG. 7 is a top plan view of the square of FIG. 6.
Figure 6:
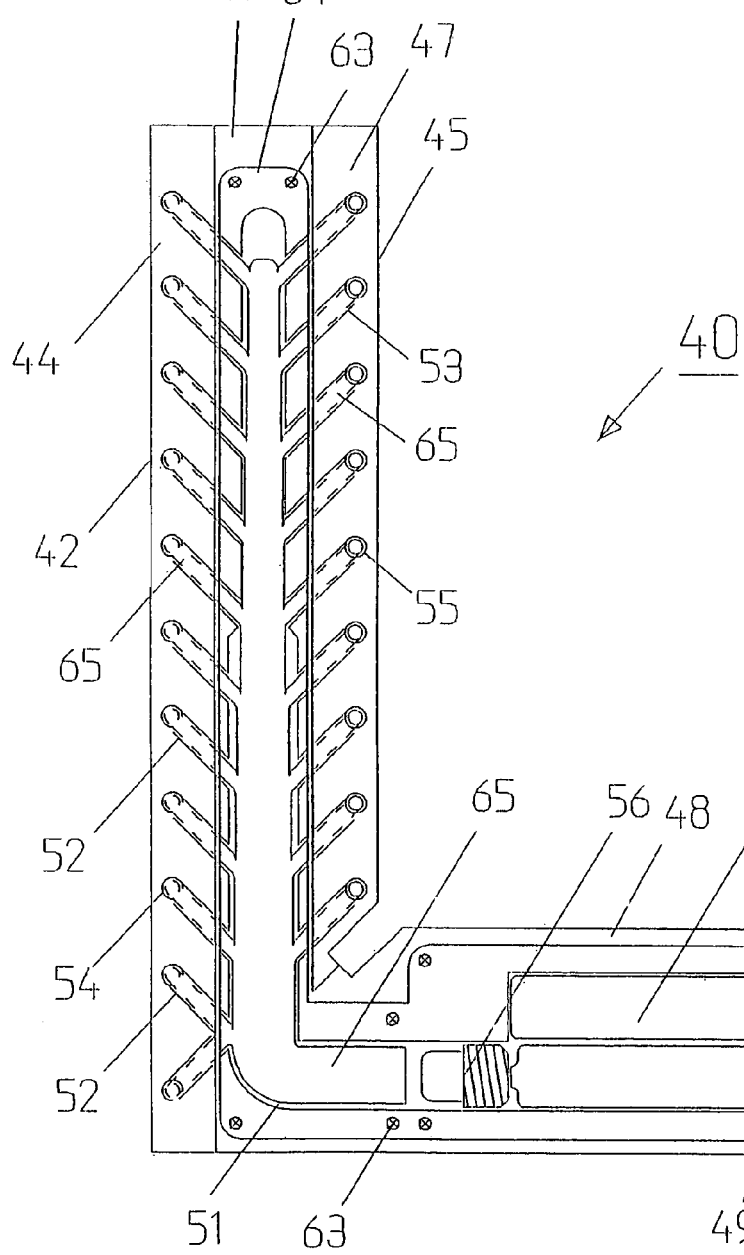
FIG. 6 is a front elevation view of a preferred embodiment of a machinist's square with cover plates removed.

Turning first to FIGS. 1 through 5, a machinist's straight edge 20 usable for testing the accuracy of a workpiece is illustrated. The straight edge 20 consists of a substantially flat, elongated member 21 having an edge 22 defined by beveled faces 23 and 24. One end of the straight edge 20 has a light source chamber 25 which is extended by a trunk passage 26 toward the other end of the straight edge 20. A plurality of branch passages 27 extend from the trunk passage 26 to an array of apertures 28 in one of the bevel faces 23. Preferably, the apertures 28 are equally displaced across the bevel face 23. A light source 29, batteries 31 and switch 32 are disposed in the chamber 25 and are electrically connected in typical flashlight fashion (not shown) for selective activation of the light source 29. Plates 33 and 34 which cover the chamber 25 and the trunk passage 26, respectively, are best seen in FIGS. 4 and 5. The plates 33 and 34 are held in place by screws 35 extending into threaded holes 36 in a cover seat 37 provided along the perimeter of the chamber 25 and trunk passage 26. Preferably, fiber optic cords 38 extend from the light source 29 to each of the apertures 28 via the main trunk passage 26 and the appropriate branch passages 27.

In operation, the machinist activates the light source 29 by use of the switch 32. Light is transmitted through the trunk and branch passages 26 and 27 from the light source 29 to the apertures 28 in the bevel face 23. Light dispersed from the apertures 28 illuminates the edge 22. The illuminated edge 22 is abutted against the workpiece surface (not shown) to be tested. The machinist observes the abutment of the edge 22 and the workpiece (not shown) from the bevel face 24 side of the straight edge 20. Any flaws in the workpiece will result in corresponding gaps between the workpiece and the edge 22. Therefore, the observation of light by the observing machinist is indicative of the existence and length of the flaw and the amount of light observed is indicative of the severity of the flaw.

Figure 8:
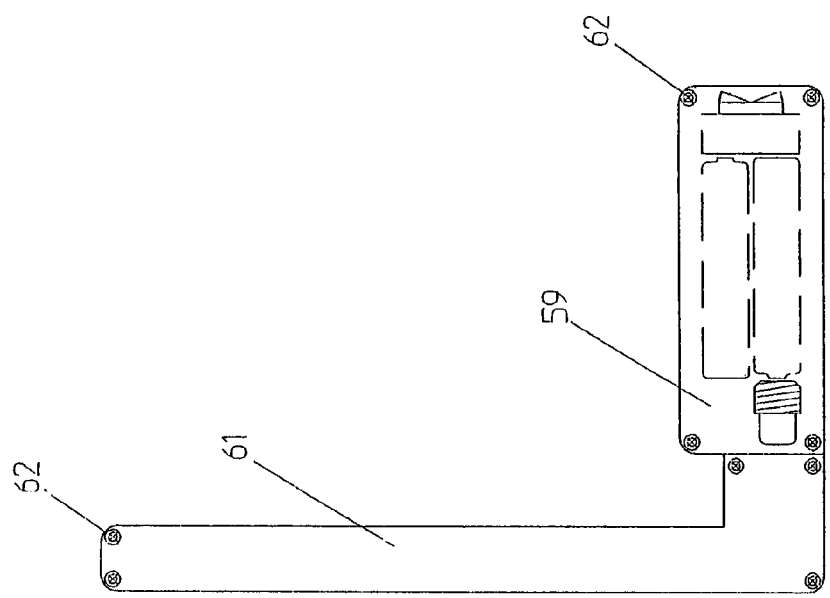
FIG. 8 is a front elevation view of the cover plates for the square of FIG. 6.
Figure 9:
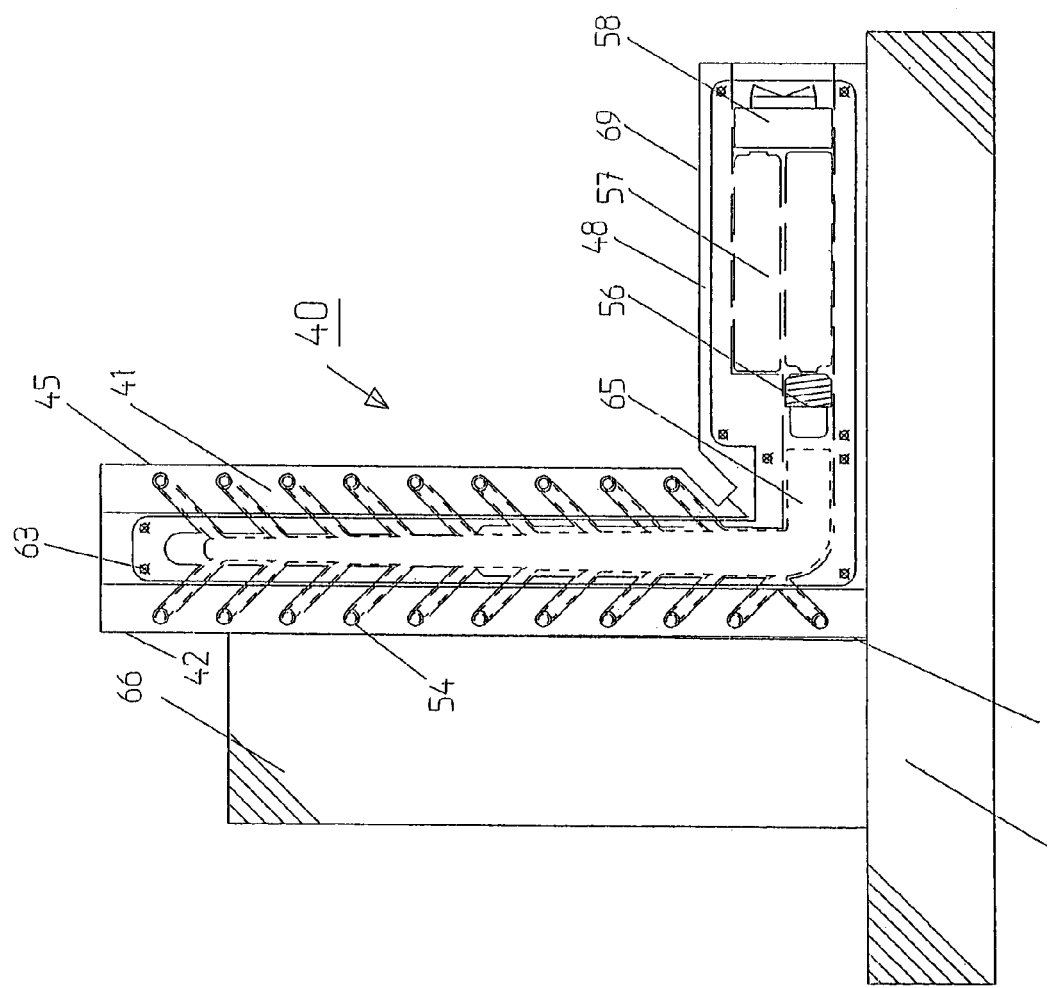
FIG. 9 is a front elevation view illustrating use of the square of FIG. 6 to test a workpiece.

Turning to FIGS. 6–9, a machinist's square embodiment of the invention is illustrated. The machinist's square 40 includes an elongated member 41 having an outside edge 42 defined by bevel faces 43 and 44 and an inside edge 45 defined by bevel faces 46 and 47. The square further includes a perpendicular member 48 joined to the elongated member 41 to form an L-shaped tool or square 40. As shown, the perpendicular member 48 contains a chamber 49 which is extended by a main trunk passage 51 into the elongated member 41. Outside branch passages 52 and inside branch passages 53 extend from the main trunk passage 51 to outside edge apertures 54 and inside edge apertures 55 in bevel faces 43 and 47, respectively. A light source 56, batteries 57 and a switch 58 disposed in the chamber 49 are electrically connected in typical flashlight fashion. As best seen in FIG. 8, plates 59 and 61 are provided to cover the chamber and trunk passages 49 and 51, respectively. The plates 59 and 61 are held in place by screws 62 threaded into holes 63 in a seat 64 provided along the perimeter of the chamber and main trunk passages 49 and 51. Fiber optic cords 65 extend from the light source 56 to the apertures 54 and 55 in the edges 42 and 45, respectively.

In operation, the switch 58 activates the light source 56 and light is transferred from the source 56 to the outside and inside arrays of apertures 54 and 55 simultaneously. However, since the arrays of apertures 54 and 55 are on bevel faces 46 and 47 which are on opposite sides of the elongated member 41, only one of the arrays of apertures 54 and 55 will disperse light on a side of the elongated member 41 which is opposite the side from which the machinist is observing the square 40. Looking at FIG. 9, a workpiece 66 to be checked is disposed on a surface plate 67. The outside edge 42 of the square 40 is abutted against the workpiece 66 and the outside edge of the perpendicular member 48 is abutted against the surface plate 67. Any flaw in the machining of the piece 66 will result in a gap 68 between the workpiece 66 and the outside edge 42 of the square 40. In the application illustrated in FIG. 9, the apertures 54 in bevel face 43 are behind the square 40 while the machinist is observing from the front of the square 40. Light dispersed from the apertures 54 and directed at the outside edge 42 will be observed by the machinist through the gap 68 so that the length and severity of the flaw 68 will be apparent to the machinist. Depending on the structural configuration of the workpiece 66 and surface plate 67, the machinist could check the accuracy of the workpiece 66 by abutting the inside edge 45 of the square 40 and the inside edge 69 of the perpendicular member 48 against the workpiece 66.

Figure 10:
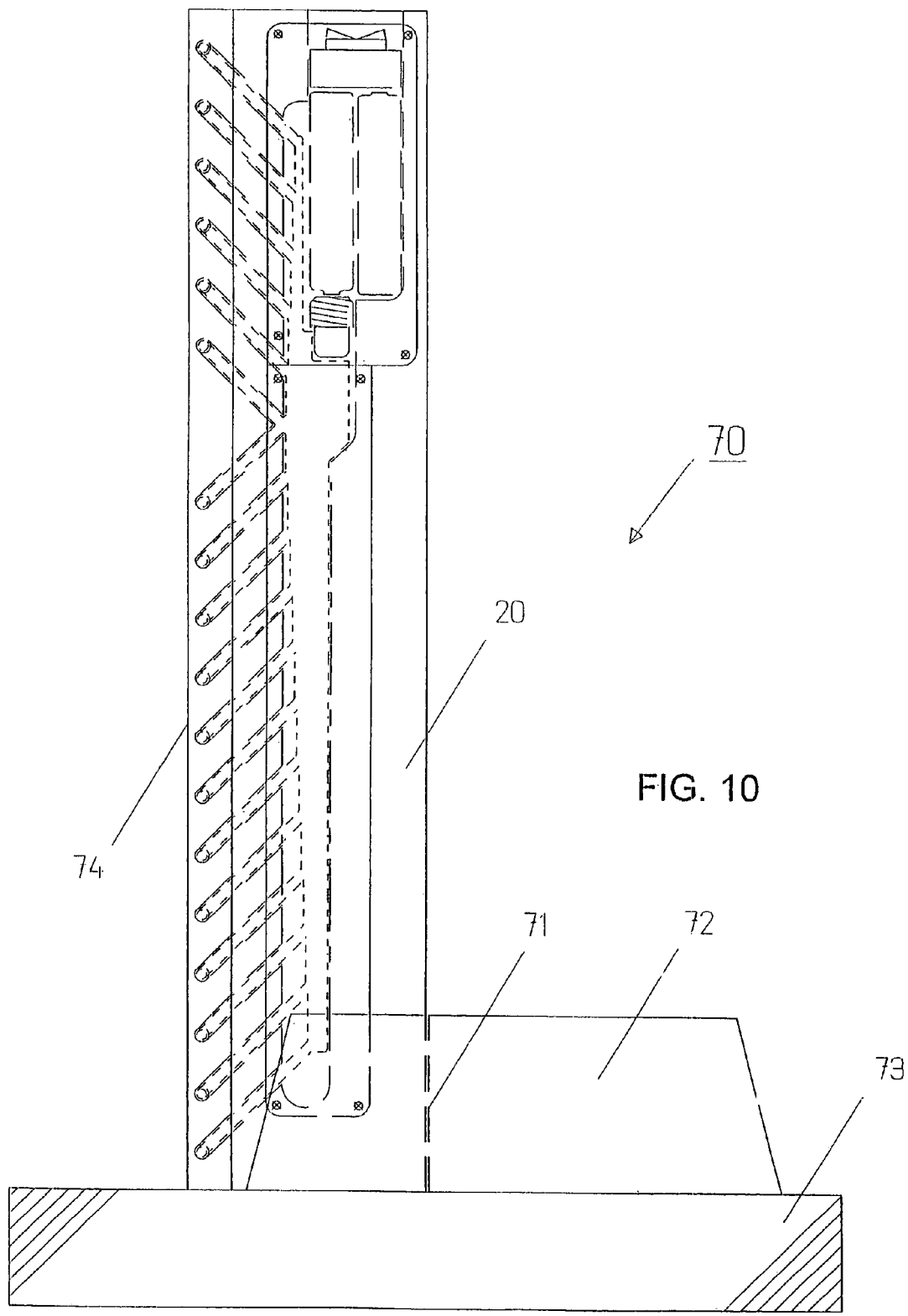
FIG. 10 is a front elevation view of a preferred embodiment of the straight edge of FIG. 1 converted into a square.

Looking at FIG. 10, a specific application converting the straight edge 20 of FIGS. 1–5 into a square 70 is illustrated. The converted square 70 is formed by inserting one end of the straight edge 20 into a complementary receptacle 71 in a movable base 72. As shown, the base 72 can be disposed against a surface plate 73 and the outside edge 74 of the straight edge 20 disposed against the workpiece (not shown). The converted square 70 can then be used in the same fashion as described in relation to the square 40 of FIGS. 6–9. Thus, a single straight edge 20 can easily be adapted for multiple uses.

Turning to FIGS. 11–14, an alternate embodiment of the straight edge 80 is illustrated. The straight edge consists of an elongated member 81 having a testing edge 82 extending along its length. A lengthwise cavity 83 is provided in the edge 82. The elongated member 81 has a power source chamber 84 at one end thereof. The chamber 84 is extended toward the other end of the member 81 by a trunk passage 85. A plurality of lamps 86, preferably equally displaced along the length of the cavity 83, are oriented to illuminate the cavity 83. The lamps 86 are energized by batteries 87 operated by a switch 88. The lamps 86 are connected to the power source by wires 89 extending in the trunk passage 85. Plates 91 and 92 are provided to cover the chamber 84 and trunk passage 85. The plates 91 and 92 are secured by screws 93 threaded into holes 94 in a seat 95 provided along the perimeter of the chamber 84 and trunk passage 85.

In operation, when the switch 88 is turned to "on," the cavity 83 is illuminated. When the edge 82 is abutted against the surface to be tested (not shown), if the surface is accurate the light will be contained within the cavity 83. If there is a flaw in the surface, light will be dispersed from the flaw so as to be observable by the machinist from either side of the straight edge 80 to permit determination of the location, length and severity of the flaw, as hereinbefore discussed.

The cavity embodiment can be extended to use in a square or other accuracy testing tool than a straight edge. The tools are preferably made of low carbon or tool steel. The batteries are preferably AAA. Surface plates are typically precision surfaced granite. The movable base for converting a straight edge into a square is preferably made of low carbon or tool steel.

Thus, it is apparent that there has been provided, in accordance with the invention, machinist's accuracy testing tool that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A tool for use by a machinist in identifying flaws in flatness of a surface of a workpiece comprising a straightedge, an edge of said straightedge for abutment with the workpiece to be tested, said edge having a lengthwise cavity therein, a light source disposed in a chamber in said straightedge, said chamber being remote from said cavity, and a plurality of passages extending within said straightedge from said light source chamber to said cavity for conducting light emitted from said source into said cavity, said cavity directing the light at the workpiece whereby flaws in the flatness of the surface of the workpiece are illuminated from within said straightedge and visible to a machinist viewing the workpiece from a position outside of said straightedge.

2. A tool for use by a machinist in identifying flaws in flatness of a surface of a workpiece comprising a straightedge, an edge of said straightedge for abutment with the workpiece to be tested, said edge having a lengthwise cavity therein, a light source disposed in a chamber in said straightedge, said chamber being remote from said cavity, and means for conducting light emitted from said source into said cavity, said cavity directing the light at the workpiece whereby flaws in the flatness of the surface of the workpiece are illuminated from within said straightedge and visible to a machinist viewing the workpiece from a position outside of said straightedge.

3. A tool according to claim 2 further comprising means for converting said straightedge into a square.

* * * * *